United States Patent [19]
Polydoris et al.

[11] 3,791,038
[45] Feb. 12, 1974

[54] MEASURING INSTRUMENT

[75] Inventors: Nicholas G. Polydoris, Kenilworth; Burnell J. Wollar, Barrington, both of Ill.

[73] Assignee: E N M Company, Chicago, Ill.

[22] Filed: Nov. 8, 1971

[21] Appl. No.: 196,358

[52] U.S. Cl. .............................................. 33/141 R
[51] Int. Cl. ............................................. G01b 3/12
[58] Field of Search .............. 33/141, 141.5; 235/95

[56] References Cited
UNITED STATES PATENTS

| | | | |
|---|---|---|---|
| 1,835,804 | 12/1931 | Morra | 33/141 R |
| 2,230,990 | 2/1941 | Bennett | 33/141 R |
| 37,002 | 11/1962 | Lawrence | 33/141 R |
| 3,458,127 | 7/1969 | Hermann | 235/95 |
| 3,458,128 | 7/1969 | Tillman | 235/95 |
| 2,493,912 | 1/1950 | Brown | 33/141 R |

FOREIGN PATENTS OR APPLICATIONS

| | | | |
|---|---|---|---|
| 584,893 | 9/1933 | Germany | 33/141 R |
| 449,505 | 6/1936 | Great Britain | 33/141 C |
| 1,067,226 | 10/1959 | Germany | 33/141 R |
| 7,481 | 10/1973 | Switzerland | 33/141 R |

*Primary Examiner*—Harry N. Haroian
*Attorney, Agent, or Firm*—Anthony S. Zummer

[57] ABSTRACT

A measuring instrument for measuring linear distance on a surface by rolling a wheel on the surface along the linear distance to be measured. The wheel is mounted in a housing, and the wheel is drivingly connected to a counter which indicates the distance which the wheel has rolled. The counter is calibrated to indicate linear measurement in a selected system of measurement.

1 Claim, 9 Drawing Figures

Patented Feb. 12, 1974
3,791,038
2 Sheets-Sheet 1
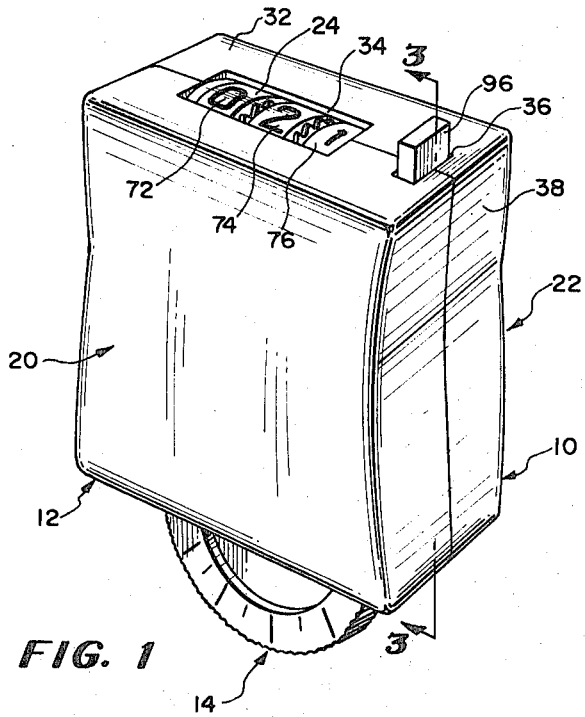
FIG. 1
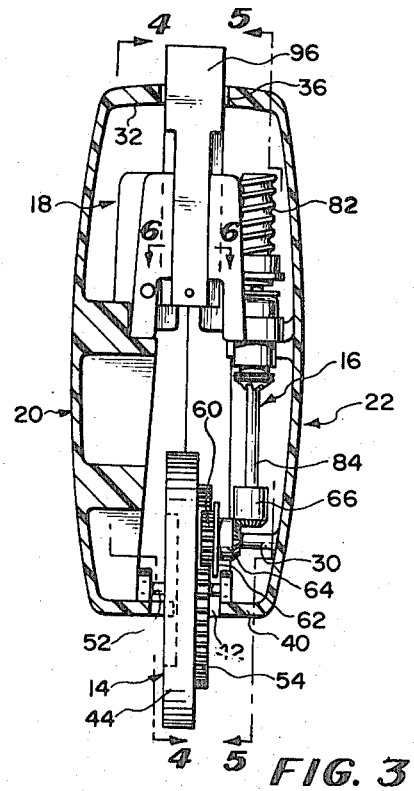
FIG. 3
FIG. 2
INVENTORS:
NICHOLAS G. POLYDORIS
BURNELL J. WOLLAR
By Stone, Zummer & Aubel
Attorneys Patented Feb. 12, 1974
3,791,038
2 Sheets-Sheet 2
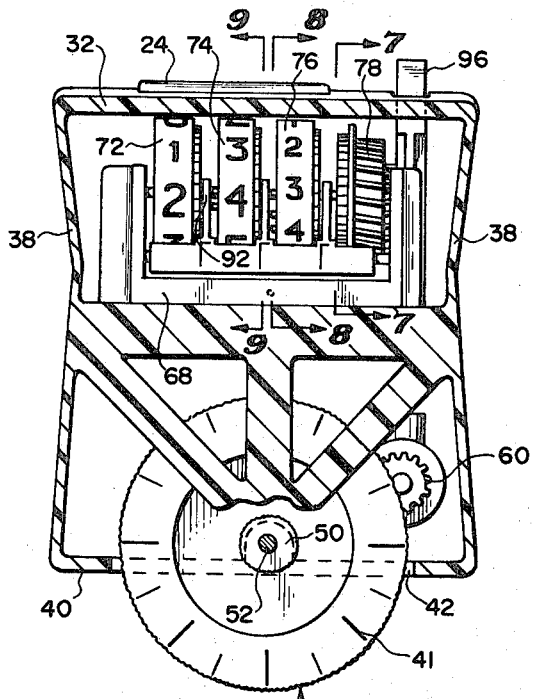
FIG. 4
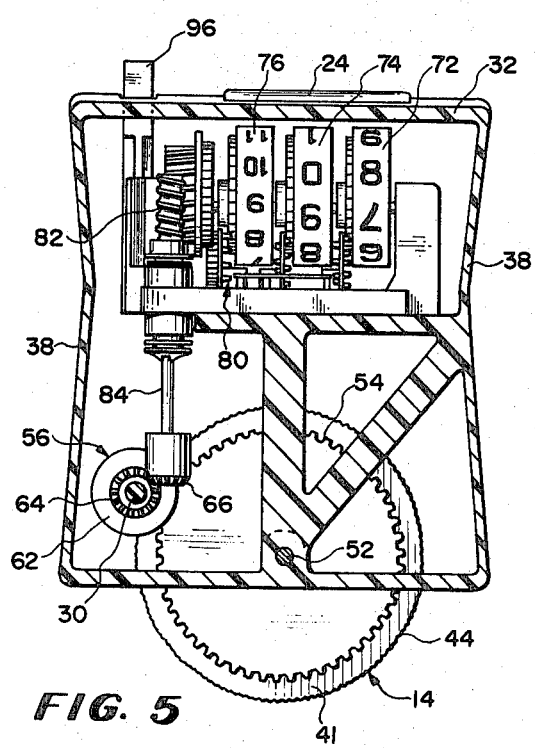
FIG. 5
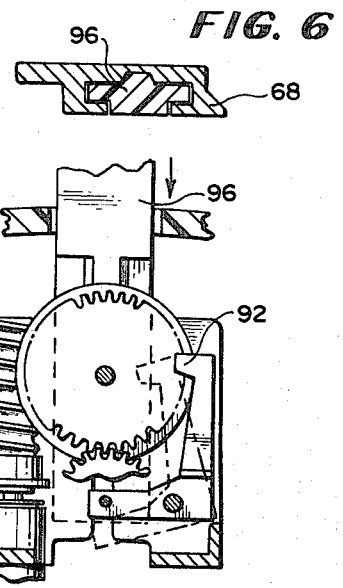
FIG. 6
FIG. 7
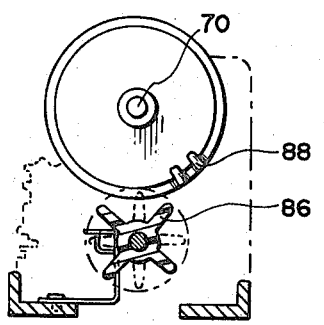
FIG. 8
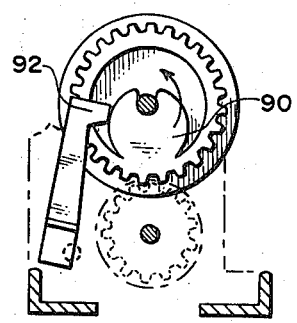
FIG. 9
INVENTORS:
NICHOLAS G. POLYDORIS
BURNELL J. WOLLAR
By Stone, Zummer & Aubel
Attorneys

MEASURING INSTRUMENT

BACKGROUND OF THE INVENTION

It is often necessarry to measure linear distances for various and sundry purposes. The customary measuring devices are calibrated sticks, such as rulers, yardsticks or folding rulers, or flexible devices, such as tape measures or steel tapes, which may be wound up in a container. The sticks which are calibrated are useful and accurate. However, these sticks are cumbersome to carry around and are not convenient for carrying in a business suit. The linear tape measures which are used for measuring distances provide a degree of convenience. However, these devices are bulky and are also not convenient to carry in a business suit. In addition, most of the steel tape measures have a relatively short length so that it is necessary to lay out the tape a plurality of times. There is a need for a linear measuring device which is lightweight, accurate and convenient to use.

SUMMARY OF THE INVENTION

The present invention provides an instrument for measuring linear distance on a surface, which instrument is lightweight, accurate and convenient to use. The instrument may measure substantial distances without any great problems in that it includes a drive wheel which engages the surface to be measured, and the drive wheel is rolled along the surface. As the drive wheel rolls along the surface, the drive wheel drives a wheel counter. The wheel counter and the drive wheel are calibrated to indicate linear distances. After the distance in question has been traversed by the wheel, the operator need only look in a window in a housing of the instrument which contains the counter and the distance is shown. In order to use the counter again, the operator simply pushes a reset button, which resets the counter back to zero, and another distance may be traversed and measured.

It is a principal object of the present invention to provide a lightweight, inexpensive linear measuring device which directly indicates a linear measurement.

It is another object of the present invention to provide a measuring instrument which simple to operate and may be readily operated by a single individual to measure substantial distances.

It is a still further object of the present invention to provide a measuring instrument which has a high degree of reliability.

Other objects and uses of the present invention will become readily apparent to those skilled in the art upon a perusal of the following specification in light of the accompanying drawings.

BRIEF DESCRIPTION OF THE DRAWINGS

FIG. 1 is a perspective view of a measuring instrument embodying the present invention;

FIG. 2 is a perspective exploded view of the measuring instrument shown in FIG. 1;

FIG. 3 is a cross-sectional view taken on Line 3—3 of FIG. 1, showing the interrelationship of the various parts of the measuring instrument;

FIG. 4 is a cross-sectional view taken on Line 4—4 of FIG. 3;

FIG. 5 is a cross-sectional view taken on Line 5—5 of FIG. 3;

FIG. 6 is a cross-sectional view taken on Line 6—6 of FIG. 3;

FIG. 7 is a cross-sectional view taken on Line 7—7 of FIG. 4;

FIG. 8 is a partial cross-sectional view taken on Line 8—8 of FIG. 4; and

FIG. 9 is a cross-sectional view taken on Line 9—9 of FIG. 4.

DESCRIPTION OF THE PREFERRED EMBODIMENT

Referring now to the drawings, and especially to FIG. 1, a measuring instrument generally indicated by numeral 10 is shown therein. The instrument 10 generally consists of a housing 12, a measuring wheel 14 rotatably mounted in the housing, a drive 16 connected to the wheel 14, and a resettable wheel counter 18 mounted within the housing 10 and connected to the drive 16.

As may be best seen in FIG. 2, which is an exploded view of the instrument 10, the housing 12 generally includes a plastic molded front half 20 and a plastic molded rear half 22. A transparent window 24 is mounted between the halves. The halves 20 and 22 are virtually mirror images of each other. Each half includes a counter shelf 26 which receives and supports the counter 18. Adjacent to the lower portion of each half, there is a wheel axle aperture 28 for receipt of a wheel axle 29, as will be described hereinafter. The rear half includes a gear shaft 30, which is formed integral therewith and supports a portion of the drive 16, as will be described in detail hereinafter.

The assembled halves 20 and 22 define a top 32, which has a window aperture 34 formed therein, into which aperture is mounted the window 24 to provide visibility of a portion of the counter 18. A reset button aperture 36 is also formed in the top 32.

The housing 12 has a pair of opposed ends 38 which are identical to each other. The ends 38 are generally concave in that there is a narrow portion of the housing between the top and bottom of the housing, as may be best seen in FIGS. 1, 4 and 5. This particular construction allows for easy holding of the instrument, even under adverse conditions.

The housing also includes a bottom 40, which has a wheel opening 42 formed therein. The openings 28 in the interior of the housing are, in this instance, positioned exactly one inch from each of the opposite edges of the bottom, for reasons which will become apparent hereinafter.

The wheel 14 has a main body 41, which is a molded plastic part. The main body has a serrated outer periphery 44. The circumference of the outer periphery is, in this instance, exactly four inches. The wheel main body 41 has an axle opening 46, in which is mounted the axle 29. The axle 29 includes a hub 50, which snugly mates with the opening 46, and a pair of outwardly extending shafts 52, which are rotatably positioned in the openings 28 to allow free rotation of the wheel relative to the housing. A spur gear 54 is molded integral with the main body. The spur gear 54 is drivingly connected to the drive 16.

The drive 16 includes a unitary molded plastic transfer wheel 56 having a shaft aperture 58. The shaft 30 is positioned in the aperture 58 so that the transfer wheel 56 is freely rotatable on the shaft. Formed integral with one end of the transfer wheel is a molded drive spur gear 60, which mates with the spur gear 54. A disc 62 is formed integral with the gear 60 to prevent the transfer wheel from moving too far toward the wheel 14. A molded bevel gear 64 is also formed integral with the transfer wheel. A molded plastic shaft bevel gear 66 meshes with the bevel gear 64. The bevel gear 66 is connected to the counter 18 to drive the counter.

The counter 18 includes a frame 68 secured to the counter shelf 26, which frame 68 has positioned thereon a wheel shaft 70. Rotatably mounted on the wheel shaft 70 are three counter number wheels 72, 74 and 76. The number wheels 72 and 74 have digits 0 through 9 consecutively thereon while wheel 76 has digits 0 through 11 consecutively thereon. The wheel 76 is connected to a drive wheel 78 through a conventional numbering wheel drive mechanism 80. The drive wheel 78 is driven by a worm 82, to which is fixed a drive shaft 84. The drive shaft 84 has fixed thereon the bevel gear 66.

The wheel 76 is intermittently drivingly connected to the wheel 74 through a conventional transfer wheel 86 and teeth 88 to rotate wheel 74 one-tenth of the rotation of the wheel 74 for every complete revolution of wheel 76. In like manner, the wheel 74 rotates the wheel 72 one-tenth revolution for each complete revolution of wheel 74. Each of the number wheels has a conventional cam 90 formed thereon, with a cam operator 92 selctively engageable with its respective cam to rotate the number wheels to a zero position. The operators 92 are connected to a conventional reset button 94, which extends through the reset button aperture 36 in the top of the housing for selectively resetting the counter.

The counter and wheel are calibrated to each other so that for every three complete revolutions of the wheel 14, the number wheel 76 makes one complete revolution. Inasmuch as the wheel 14 has a circumference of four inches and the number wheel 76 has numerals 0 through 11, the number of inches traversed by the wheel is indicated on the counter. Each time the wheel 76 makes a complete revolution, the wheel 74 is moved one-tenth of its rotation, thereby indicating the number of feet which the measuring wheel 14 has traversed in units, and the tens of feet are indicated on number wheel 72. It may be therefore appreciated that the instrument may indicate 100 feet or any amount thereunder.

It may be appreciated that there may be instances when the wheel cannot be placed at exactly the beginning or the end of a measurement, such as at a corner. In view of the fact that the distance from the center of the wheel to either end of the bottom is exactly one inch, the operator need only add one inch to the indicated measurement if the measurement either commenced or terminated at a point where the edge abutted a surface; or in the case where both the beginning and end of the measurement abutted a surface, the operator need only add two inches.

Once the measurement has been made and properly recorded or noted, the operator need only push the reset button 96 to set the number wheels back to zero and the instrument is ready to make another measurement. It may be appreciated that there is no need for an operator to wind up a tape or to put away a measuring stick, and there is a record of the measurement which may be retained. The device may be moved to another location with the measurement still on the device. There is no opportunity for someone's finger to slip off a point on a measuring instrument and thereby lose the measurement.

The construction of the present device is quite simple and highly reliable. The axle for the measuring wheel is held between the front and back halves of the housing. The wheel itself is connected to the axle and is held in position by the housing. The transfer wheel is rotatably mounted on the shaft 30 and is held in position by the measuring wheel and the bevel gear 66, which in turn is fixed to the counter. Thus, the assembly of the present instrument is simple, and, of course, it is easy to manufacture.

Although a specific embodiment of the herein-described invention has been described in detail and has been described in terms of a device for measuring in feet and inches, it is readily apparent that other units, such as those of the metric system, may be used. It is also readily apparent that those skilled in the art may make various modifications and changes in the present construction without departing from the spirit and scope of the present invention. Therefore, the present invention is limited only by the appended claims.

What is claimed is:

1. A portable hand-holdable instrument for measuring linear distance on a surface and providing visible indication of measured distance comprising, a housing having a pair of molded halves, said housing having a top with a window aperture formed therein, a window mounted in the window aperture, said housing having concave opposed ends substantially perpendicular to the top, a wheel counter mounted in said housing adjacent to the window, said counter having a reset button protruding through the top of said housing, said counter having a drive shaft, a molded bevel gear mounted on the drive shaft, a unitary, molded transfer gear member comprising a second bevel gear at one end and a spur gear at the other end and with a disc member of greater diameter than said gears therebetween said transfer gear member being rotatably mounted on a gear shaft formed integral with one of the molded halves of the housing with said second bevel gear meshing with said first bevel gear, a molded drive wheel rotatably mounted in the housing and having a portion of its outer periphery extending beyond said housing, and a second spur gear molded integral with the drive wheel and meshing with the first-mentioned spur gear, said disc member being so dimensioned and positioned as to abut said second spur gear to prevent shifting of said transfer gear member in a direction preventing disengagement of said first and second bevel gears, said drive wheel having its circumference calibrated to the counter to indicate a measured distance for each revolution of the drive wheel, whereby an operator may grip the housing on its concave opposed ends and observe the wheel counter through the top of the housing.

* * * * *